(12) United States Patent
Dhanda et al.

(10) Patent No.: US 8,625,231 B1
(45) Date of Patent: Jan. 7, 2014

(54) ADJUSTING VGA ANALOG GAIN FOR MISALIGNED SERVO SECTORS IN A DISK DRIVE

(71) Applicant: HGST Netherlands B.V., Amsterdam (NL)

(72) Inventors: Abhishek Dhanda, San Jose, CA (US); Toshiki Hirano, San Jose, CA (US); Tetsuo Semba, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/672,567

(22) Filed: Nov. 8, 2012

(51) Int. Cl.
G11B 5/596 (2006.01)

(52) U.S. Cl.
USPC .......................................... 360/77.04; 360/75

(58) Field of Classification Search
None
See application file for complete search history.

(56) References Cited

U.S. PATENT DOCUMENTS

| | | | | |
|---|---|---|---|---|
| 4,549,232 A * | 10/1985 | Axmear et al. | ............ | 360/77.07 |
| 5,117,408 A * | 5/1992 | Weispfenning et al. | ... | 360/78.14 |
| 5,136,439 A * | 8/1992 | Weispfenning et al. | ... | 360/77.08 |
| 5,182,682 A * | 1/1993 | Weispfenning et al. | ... | 360/77.08 |
| 5,774,298 A * | 6/1998 | Cheung et al. | ............ | 360/77.08 |
| 5,796,535 A | 8/1998 | Tuttle et al. | | |
| 5,818,659 A * | 10/1998 | Cheung et al. | ............ | 360/77.08 |
| 5,966,258 A | 10/1999 | Bliss | | |
| 6,052,804 A | 4/2000 | Thowe et al. | | |
| 6,078,445 A | 6/2000 | Serrano et al. | | |
| 6,144,513 A | 11/2000 | Reed et al. | | |
| 6,195,220 B1 * | 2/2001 | Ellis et al. | .................. | 360/77.08 |
| 6,324,030 B1 * | 11/2001 | Cheung et al. | ............ | 360/77.08 |
| 6,469,849 B1 * | 10/2002 | Ellis et al. | .................. | 360/77.08 |
| 6,873,483 B2 * | 3/2005 | Hetzler et al. | ............. | 360/77.08 |
| 6,967,808 B1 * | 11/2005 | Bandic et al. | ............. | 360/77.08 |
| 6,975,471 B2 * | 12/2005 | Bandic et al. | ............. | 360/77.08 |
| 7,016,140 B1 * | 3/2006 | Schultz et al. | .................. | 360/75 |
| 7,268,969 B2 * | 9/2007 | Schultz | ..................... | 360/77.04 |
| 7,551,390 B1 | 6/2009 | Wang et al. | | |
| 7,663,835 B1 | 2/2010 | Yu et al. | | |
| 8,446,687 B2 * | 5/2013 | Hironaka et al. | ................ | 360/75 |
| 2005/0248873 A1 * | 11/2005 | Coker et al. | ..................... | 360/75 |
| 2005/0249106 A1 * | 11/2005 | Coker et al. | ............... | 369/275.1 |
| 2005/0254156 A1 * | 11/2005 | Bandic et al. | ............. | 360/77.08 |
| 2005/0254160 A1 * | 11/2005 | Bandic et al. | ............. | 360/77.08 |
| 2011/0188147 A1 | 8/2011 | Cho et al. | | |
| 2012/0014011 A1 | 1/2012 | Wilson | | |

* cited by examiner

*Primary Examiner* — Hoa T Nguyen
*Assistant Examiner* — James L Habermehl
(74) *Attorney, Agent, or Firm* — G. Marlin Knight

(57) ABSTRACT

Embodiments of the invention include data storage system with a servo system with a VGA feedback loop that corrects gain errors for servo bursts arising from track phase misalignment and difference in frequencies between AGC and servo bursts for seamed and seamless servo patterns. After the servo fields have been written as part of the manufacturing process, in one embodiment measurements of phase misalignment are made and recorded in nonvolatile memory for use during normal operation of the drive. One embodiment includes measuring misalignment using relative signal magnitudes from test bursts with various linear densities written in a data area during the self-servo writing process. In an alternative embodiment the measurements of phase misalignment can be made real-time during normal operation of the drive.

17 Claims, 19 Drawing Sheets

Quad Pattern
FIG. 1A (Prior Art)
Null Pattern
FIG. 1B (Prior Art)
| | 1T AGC | | | | | 2T Burst P | | | | | 2T Burst Q | | | |
|---|---|---|---|---|---|---|---|---|---|---|---|---|---|---|
| Trk k | + | - | + | - | | + | - | + | - | | - | + | - | + |
| | + | - | + | - | | + | - | + | - | | + | - | + | - |
| Trk k+1 | + | - | + | - | | - | + | - | + | | + | - | + | - |
| | + | - | + | - | | - | + | - | + | | - | + | - | + |
FIG. 1C (Prior Art)

Seamed AGC with Seamed Bursts

Two servo track generated by writing every ½ track (1-4). Both AGC and burst are written in seamed manner.

Write gate state: pattern written during high

Seamed AGC with Seamless Bursts

Two servo track generated by writing every ½ track (1-4). AGC is written in seamed manner (at 1-4) while bursts are written in seamless manner (P written at 1,3, Q written at 2,4).

Write gate state: pattern written during high

Seamless AGC with Seamed Bursts

Two servo track generated by writing every ½ track (1-4).
AGC written in seamless manner at 1, 3
and burst are written in seamed manner at 1-4.

Write gate state: pattern written during high

Seamed AGC with Seamless Bursts

Two servo track generated by writing every ½ track (1-4). AGC is written in seamless manner (at 1, 3). Bursts are written in seamless manner (P written at 1,3 and Q written at 2,4).

Write gate state: pattern written during high

| | AGC | P | Q |
|---|---|---|---|
| Trk k | + | + | − |
| Trk k | + | + | + |
| Trk k+1 | + | − | + |
| Trk k+1 | + | − | − |
| Trk k+2 | + | + | − |
| Trk k+2 | + | + | + |
| Trk k+3 | + | − | + |
| Trk k+3 | + | − | − |

Tracks with no squeeze (same track pitch for all tracks)

Case 1

FIG. 1L (Prior Art)

| | AGC | P | Q |
|---|---|---|---|
| Trk k | + | + | − |
| Trk k | + | + | + |
| Trk k+1 | + | − | + |
| Trk k+1 | + | − | − |
| Trk k+2 | + | + | − |
| Trk k+2 | + | + | + |
| Trk k+3 | + | − | + |
| Trk k+3 | + | − | − |

Tracks with squeeze in Trk k+1 (smaller track pitch as compared to others)

Case 2

FIG. 1M (Prior Art)

Squeeze measurement is based on recording the change in burst profile induced by squeeze as shown above for case 1 (no squeeze) and case 2 (with squeeze)

Application: Servo Track Pitch and Rd/Wr offset from Burst Profile

Rd/Wr offset based on burst crossing signal, e.g. based on a selected function of burst amplitudes f(a,b) at selected points. Servo metric based on ratio of burst amplitudes (e.g. f(a/b) for PQ.

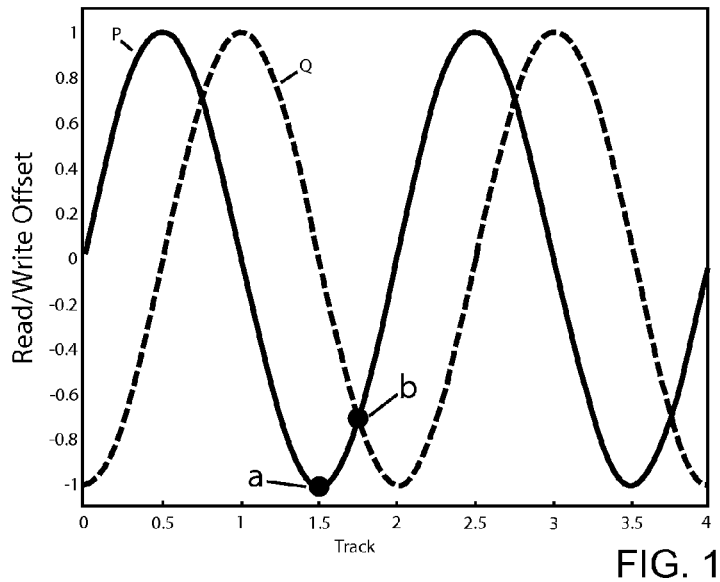

FIG. 1O (Prior Art)

Rd/Wr offset based on burst crossing signal, e.g. based on selected function f(a1,a2,a3,a4) of ABCD burst amplitudes at selected points.

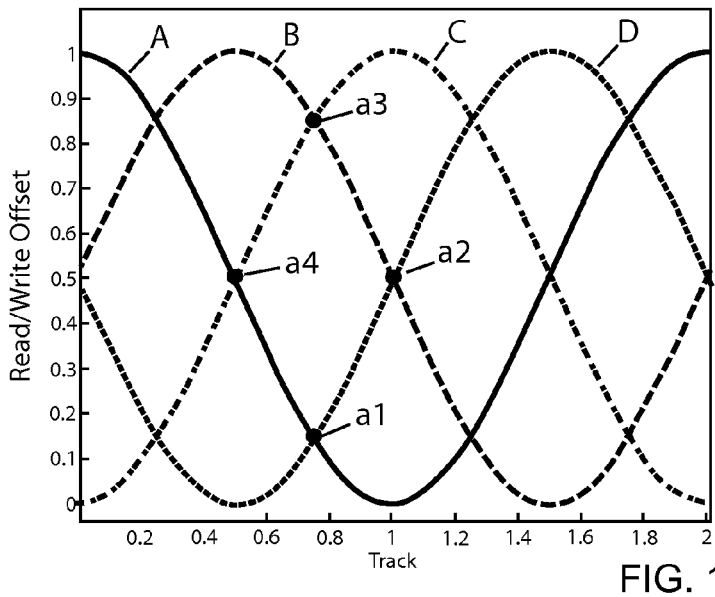

FIG. 1P (Prior Art)

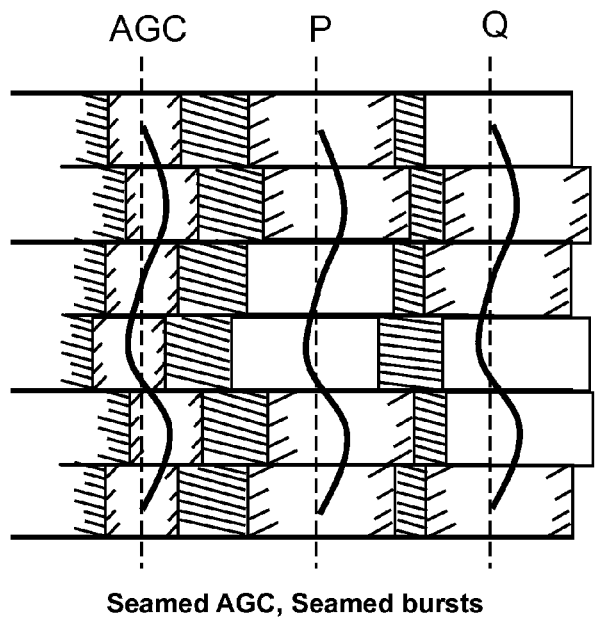
Seamed AGC, Seamed bursts    FIG. 2A (Prior Art)
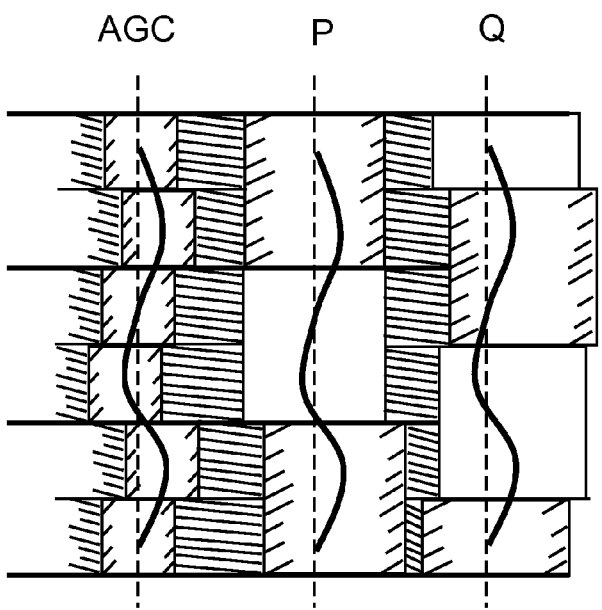
Seamed AGC, Seamless bursts    FIG. 2B (Prior Art)

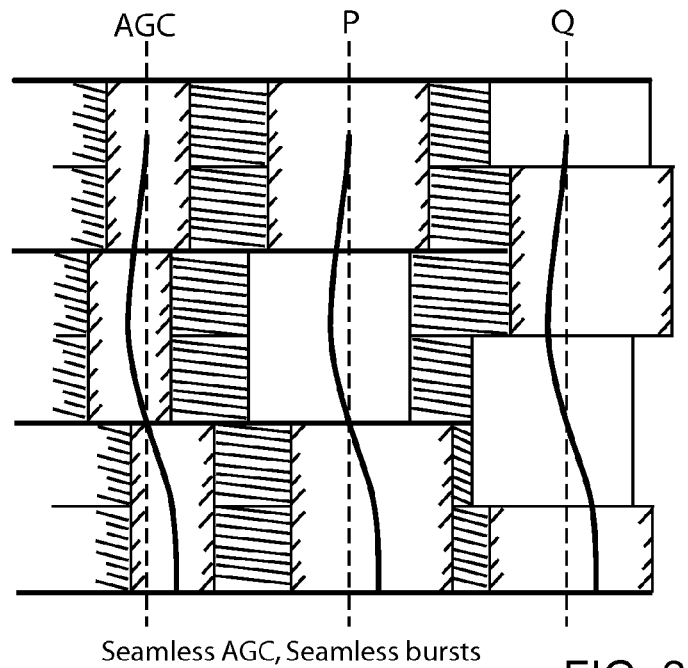
Seamless AGC, Seamless bursts    FIG. 2C (Prior Art)
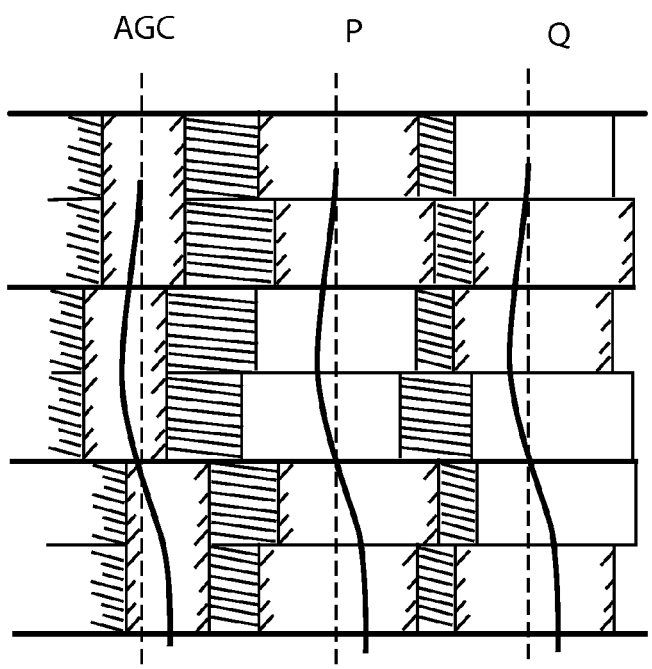
Seamless AGC, Seamed bursts    FIG. 2D (Prior Art)

Seamless AGC, Seamless bursts  FIG. 4A
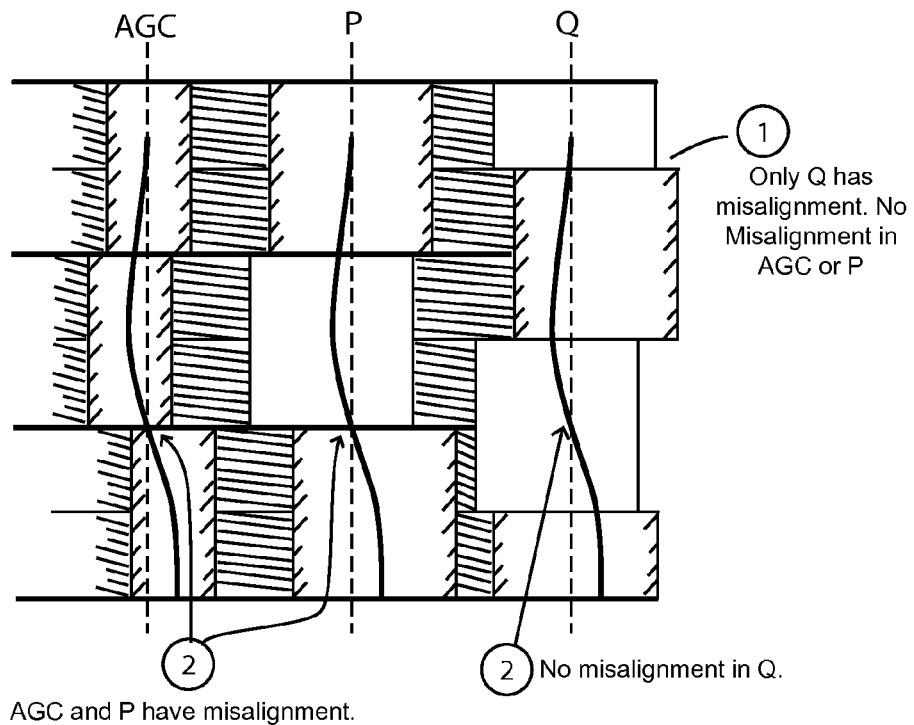
FIG. 4B
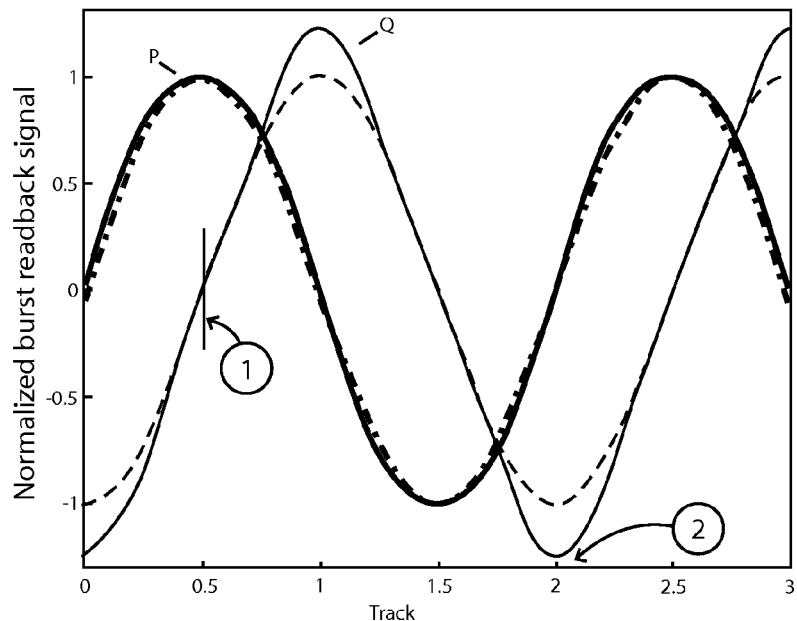
Seamless PQ bursts scaled by VGA
gain calibrated for seamless AGC Methods to measure track misalignment using phase information from PQ servo bursts for seamless bursts, example with seamed AGC and seamless bursts.

Measured burst phase proportional to phase mismatch.

Burst gate opened after fixed time delay from sync mark

Sync mark will follow AGC phase mismatch

US 8,625,231 B1

ADJUSTING VGA ANALOG GAIN FOR MISALIGNED SERVO SECTORS IN A DISK DRIVE

FIELD OF THE INVENTION

The present invention relates generally to disk drive technology, and more particularly to means for processing servo signals generated by magnetic servo patterns on a rotating disk.

BACKGROUND

Magnetic disk drive systems typically include one or more sliders that contain read and write heads that are used to read and write data in thin film magnetic media on one of more rotating disks. The sliders are mounted on a movable actuator that is positioned by a servo system over the rotating disk using a VCM. The information in the thin film magnetic material on each disk surface is organized into concentric circular tracks that are further divided into angularly spaced servo sectors. Each sector has servo information permanently recorded therein as a part of the manufacturing process. The user data in the sector follows the servo information. The servo information typically includes track and sector location information, automatic gain control (AGC) fields, timing sync signals, and servo bursts. The servo bursts are arranged in specially designed patterns to generate a read head signal that gives fractional track centerline information from which the drive's controller can determine where the read head is in relation to the center of the track. One typical servo burst pattern includes four bursts referred to as A, B, C and D and is called a quad-burst pattern. FIG. 1A is a block diagram illustrating the allocated linear positioning of fields in a quad burst servo pattern according to the prior art. The actual cross-track positions of the A, B, C and D bursts are arranged in a repeating pattern that provides the fractional track centerline information. Depending upon the SNR requirements, the burst pattern may be written at lower linear densities than the AGC field. The cross-track widths of the servo bursts can be equal to one-track width, but other widths can be used such as two-thirds or one-half of a track width. An alternate servo system using a "null pattern" using P and Q bursts is illustrated in FIG. 1B. FIG. 1C illustrates two adjacent tracks that have a servo burst pattern written at one-half of a track width. The "+" and "−" symbols represent the two magnetic orientations that have been previously written in the thin film magnetic material on the disk during the manufacturing process.

Seamless servo writing techniques use independent positioning of the bursts and AGC fields during servo writing process such that different regions of a servo pattern are written in different steps or passes. Seamless and seamed servo burst patterns using P and Q bursts have also been developed.

FIG. 1D illustrates two adjacent tracks that have a servo burst pattern written at one-half of a track width with both AGC and servo burst fields written in a seamed manner in four passes which are represented by the circled numbers 1-4. FIG. 1E illustrates the write gate pattern for the four phases of the writing process for two tracks k and k+1 illustrated in FIG. 1D. In each of the four phases the AGC, P and Q are written as one-half track width.

FIGS. 1F and 1G illustrate the four phases of writing a seamed AGC with seamless P and Q bursts on two adjacent tracks. In each of the four phases the AGC is written, but the P burst is only written on the first and third phase and the Q burst is only written on the second and fourth phase. In this example and the following ones, the two track pattern is repeated for the entire set of tracks.

FIGS. 1H and 1I illustrate the four phases of writing a seamless AGC with seamed P and Q bursts on two adjacent tracks. In each of the four phases the P and Q bursts are written, but the AGC is only written on the first and third phase. FIGS. 1J and 1K illustrate the four phases of writing a seamed AGC with seamless P and Q bursts on two adjacent tracks. The AGC is only written on the first and third phase. The P bursts are written on the first and third phase, and the Q bursts are written on the second and fourth phase.

The servo fields define the track width and the pitch. Ideally each track will have the same width and the track pitch will be constant as illustrated in FIG. 1L. The width of the track is defined during the servo writing process. FIG. 1M illustrates a problem case in which the track pitch in one track (k+1) has a narrower width than the other tracks. This is called track squeeze.

The signals generated in the read head by the servo fields are processed by the drive's electronics that include a pre-amplifier and a read/write channel. In US patent application 20110188147 by Cho, et al. (Aug. 4, 2011) a method of adjusting gain of a variable gain amplifier (VGA) of a read/write channel is described. The VGA amplifies a signal provided by the pre-amplifier based on a gain control signal of the AGC.

US patent application 20120014011 by Wilson (Jan. 19, 2012) describes a magnetic recording system with a read channel that includes a variable gain amplifier (VGA) and continuous-time filter (CTF), and an analog-to-digital converter (ADC) 122 connected in series to produce an input signal for a digital signal processing (DSP) block. The input signal for the read channel comes from the preamp which includes a loopback channel that allows a user to characterize frequency response at selected frequencies, and to derive a correction factor to remove gain changes. The loopback channel supports low-nm fly-height measurement. The loopback channel also allows write data-to-read data timing to be measured, in support of bit-patterned media (BPM).

U.S. Pat. No. 7,551,390 to Wang, et al. (Jun. 23, 2009) describes a method to characterize misaligned servo wedges. The servo controller is used to characterize misaligned servo wedges by implementing operations including: commanding the head to track follow on a track; measuring wedge-to-wedge time (WTWT) values corresponding to time intervals between identified servo wedges; calculating wedge-to-wedge time (WTWT) variations for the measured WTWT values; and characterizing the calculated WTWT variations, wherein, characterizing the calculated WTWT variations for the track includes utilizing a WTWT variation modeling function to model the WTWT variations.

In U.S. Pat. No. 7,663,835 (Feb. 16, 2010) Yu, et al. describe a method of measuring track squeeze based on ABCD burst readback profile. The method is based on using head read-out signal for servo bursts (A, B, C, D) to estimate the servo written-in errors or track squeeze by comparing measured burst readings to nominal values. This method requires an accurate burst readback profile. The voltage readback will vary based on the amount of phase misalignment and thereby introduce error in burst readback measurement.

Track misalignment refers to finite circumferential shift in servo sector locations between adjacent tracks. Misalignment arises from disturbance in servo writing process (SSW) which results in deviation from ideal servo sector location. FIGS. 2A-D illustrate a track misalignment problem in the prior art in various combinations of seamed and seamless AGC and P-Q burst servo formats.

Track misalignment causes magnetic signal loss, which is addressed by the present invention. As illustrated in FIG. 3, for the same physical misalignment, signal loss is different for 1T versus 2T servo patterns (where T is related to the linear bit density of the signal).

As illustrated in FIGS. 4A-B, track misalignment in seamless patterns is further complicated where AGC, P and Q bursts can have different misalignment. This results in further distortion in burst profile where one burst has same misalignment as AGC while other burst does not. VGA gain adjustment follows AGC misalignment.

SUMMARY OF THE INVENTION

Embodiments of the invention include data storage system with a servo system with a VGA feedback loop that corrects gain errors for servo bursts arising from track phase misalignment and difference in frequencies between AGC and servo bursts for seamed and seamless servo patterns. After the servo fields have been written as part of the manufacturing process, in one embodiment measurements of phase misalignment are made and recorded in a table in nonvolatile memory for use during normal operation of the drive. In an alternative embodiment the measurements of phase misalignment can be made real-time during normal operation of the drive. One embodiment measures the phase mismatch by opening the burst gate a fixed time delay after the sync mark. Another embodiment writes selected test bursts with differing linear bit density in the user data as part of the manufacturing process and then measures the relative magnitude of the readback signals to determine misalignment. The test bursts are written at the same time as servo fields during self-servo writing (SSW) and, therefore, will have same misalignment, if any, as the functional servo burst fields. Once the misalignment test is done, these additional test bursts are overwritten when user data is written in the standard way. The measured misalignments are used to separately correct the VGA gain, for example, for the P and Q bursts.

The invention addresses the problem of phase mismatch causing different gain loss for 1T versus 2T versus 4T signals where T is the time period corresponding to the linear bit density. VGA gain is corrected (adjusted) for difference in AGC versus burst frequencies for misaligned tracks. The VGA feedback loop makes adjustments for gain errors induced by phase mismatch. The invention provides correct cross-track burst profiles for servo sectors with significant phase mismatch with respect to adjacent tracks. Gain for the burst signal is adjusted to take into account half-frequency of ABCD or PQ burst signals. The results are reduced measurement noise for servo metrics that are based on cross-track burst profile/VGA values and direct improvement in track squeeze measurement. The contribution of down-track phase shift from squeeze metric is removed. The invention provides accurate measurement of VGA change due to fly height/magnetic effects and removes VGA gain change arising from phase mismatch. Since 2T or 4T bursts can result in voltage saturation if large erroneous gain is selected in VGA loop, AGC saturation for servo with large phase mismatch is prevented which allows more accurate tuning of VGA gain.

An embodiment of the invention makes proportional scaling adjustments to VGA-multiplier based upon factors that can include location of read-head within the servo field; phase misalignment/mismatch of adjacent servo tracks, and length of AGC magnets. For the location of read-head within the servo field the gray code field can have one VGA-multiplier, for example, and the null servo fields can have separate VGA-multiplier because they have different dimension from gray code field and they are affected more by servo track misalignment and mismatch. For seamless servo patterns, independent writing can result in different misalignments occurring in the AGC, P, and Q bursts. This necessitates using different VGA multiplier for AGC, P and Q bursts. It should be noted that AGC field can still be used for initial VGA calibration test. For the phase misalignment/mismatch of adjacent servo tracks, misalignments can be determined during manufacturing tests and a lookup table of drive parameters can be saved for reference during field operation, but misalignments can also be determined in the field. The length of AGC magnets (e.g. 1T versus 2T AGC) can be compared to null burst magnets (e.g., 1T versus 2T burst). For example, null bursts magnets are written at lower frequency and thus may need different VGA-multiplier. In addition misalignment will affect lower frequency magnetic bursts less due to larger dimensions.

BRIEF DESCRIPTION OF THE FIGURES

FIG. 1A is a block diagram illustrating fields in a quad burst servo pattern according to the prior art.

FIG. 1B is a block diagram illustrating fields in a null servo pattern according to the prior art.

FIG. 1C illustrates two adjacent tracks that have a servo burst pattern written at one-half of a track width according to the prior art.

FIG. 1L illustrates the ideal track pitch in which each track has the same width according to the prior art.

FIG. 1M illustrates a problem case in which the track pitch in which one track has a narrower width than the other tracks according to the prior art.

FIG. 1O illustrates the read/write (Rd/Wr) offset based on the burst crossing signal which can be based on a selected function of the P-Q burst amplitudes measured at selected points.

FIG. 1P illustrates the read/write (Rd/Wr) offset based on the burst crossing signal which can be based on a selected function of the ABCD burst amplitudes measured at selected points.

FIG. 2A illustrates track misalignment in seamed AGC, seamed P-Q burst format.

FIG. 2B illustrates track misalignment in seamed AGC, seamless P-Q burst format.

FIG. 2C illustrates track misalignment in seamless AGC, seamless P-Q burst format.

FIG. 2D illustrates track misalignment in seamless AGC, seamed P-Q burst format.

FIGS. 4A-B illustrate track misalignment in seamless patterns where AGC, P and Q bursts can have different misalignment.

DETAILED DESCRIPTION OF THE INVENTION

Figure 1D:
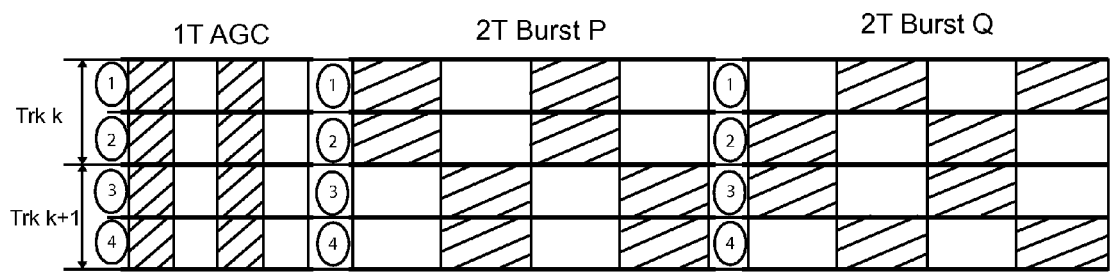
FIG. 1D illustrates two adjacent tracks that have a servo burst pattern written at one-half of a track width with both AGC and servo burst fields written in a seamed manner according to the prior art.
Figure 1E:
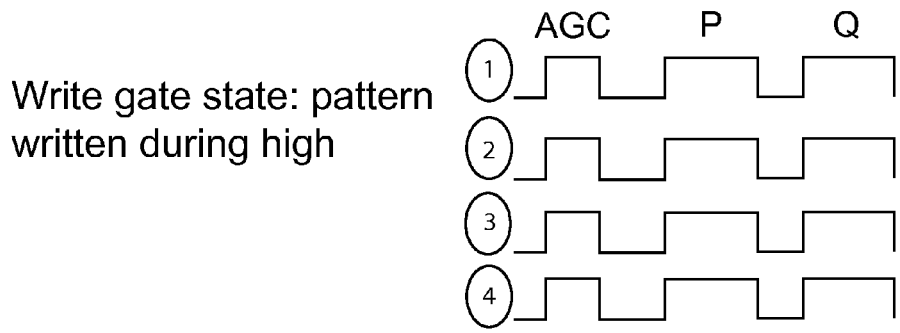
FIG. 1E illustrates the write gate pattern for the four phases of the writing process for two tracks k and k+1 illustrated in FIG. 1D.
Figure 1F:
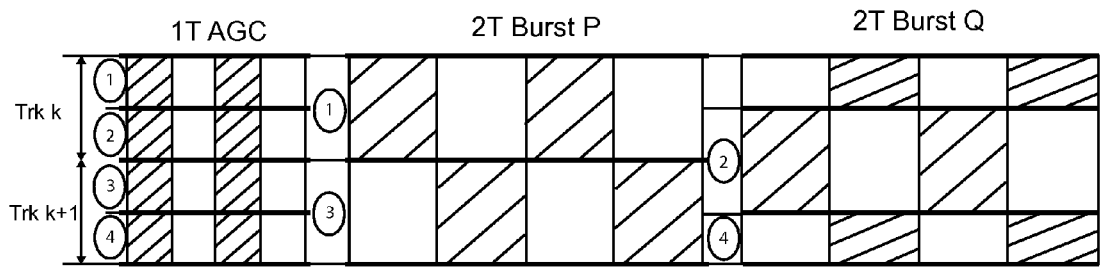
FIGS. 1F and 1G illustrate the four phases of writing a seamed AGC with seamless P and Q bursts on two adjacent tracks according to the prior art.
Figure 1G:
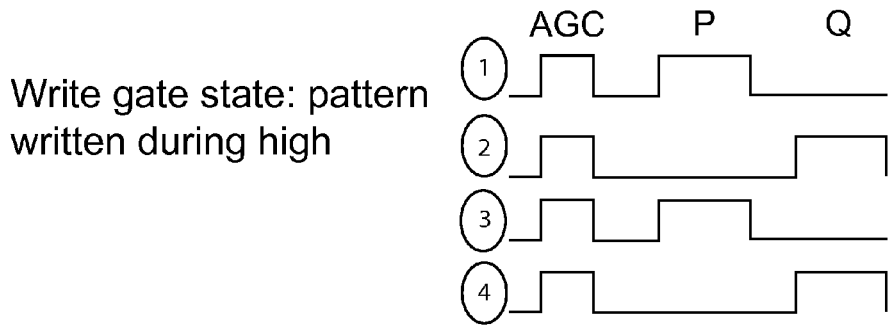
Figure 1H:
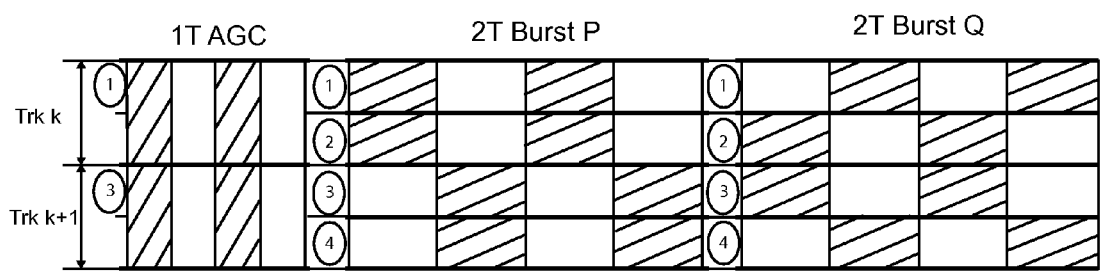
FIGS. 1H and 1I illustrate the four phases of writing a seamless AGC with seamed P and Q bursts on two adjacent tracks according to the prior art.
Figure 1I:
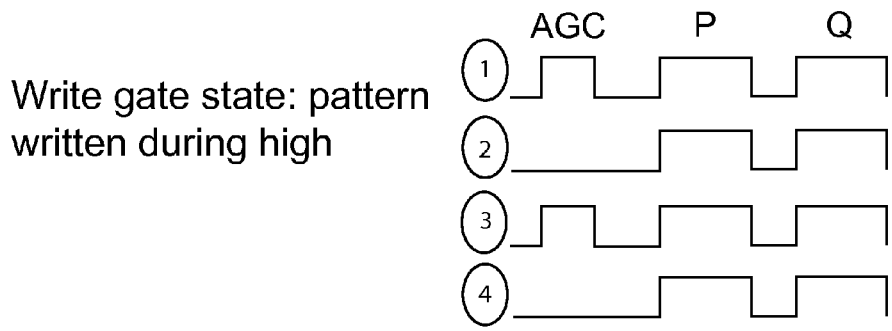
Figure 1J:
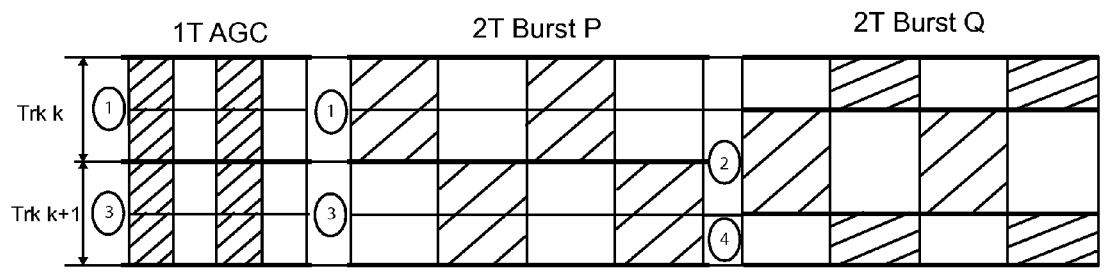
FIGS. 1J and 1K illustrate the four phases of writing a seamed AGC with seamless P and Q bursts on two adjacent tracks according to the prior art.
Figure 1K:
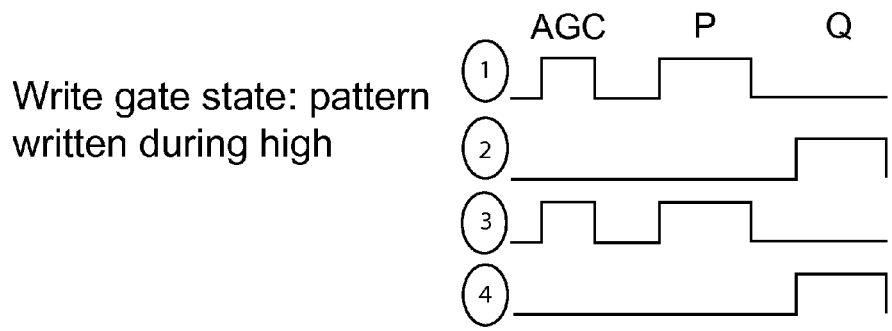
Figure 1N:
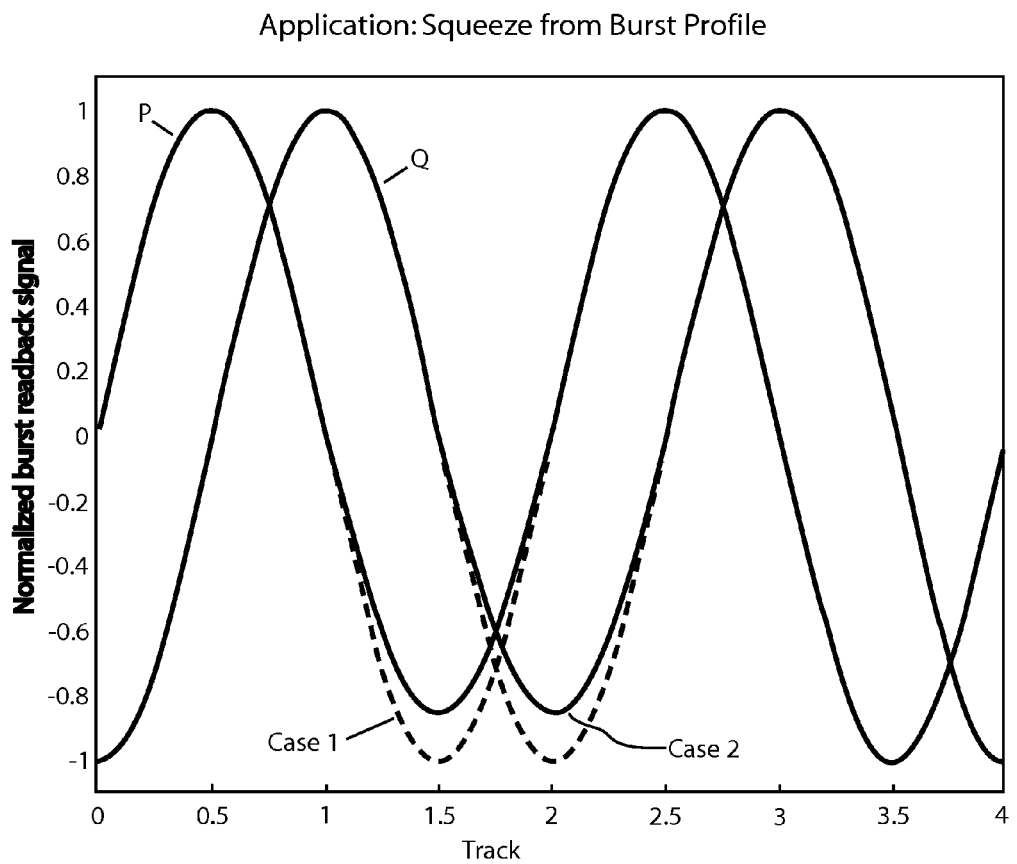
FIG. 1N illustrates the effect on the burst signal readback for the track squeeze problem case according to the prior art.

Accurate cross-track servo burst (ABCD) profile is required for various servo related error scans. For example, track squeeze measurement is based on change in burst profile due to cross-track squeeze as shown in FIGS. 1L, 1M, 1N which describe the squeeze measurement technique based on recording the changes in burst profile induced by cross-track squeeze. A squeeze error occurs when the width of a data track is too narrow and causes partial erasure of adjacent data tracks. As shown in graph in FIG. 1N, the amplitude of the P and Q burst signals is reduced by the track squeeze.

Other examples of servo calibration steps that are based on servo burst profiles include estimation of read/write head offset and determination of servo metric as shown in FIGS. 1O, 1P. In these processes, burst crossing signal and ratio of burst amplitudes are used to adjust servo related parameters. FIG. 1O illustrates the read/write (Rd/Wr) offset based on the burst crossing signal which can be based on a selected function of the P-Q burst amplitudes measured at selected points. FIG. 1P illustrates the read/write (Rd/Wr) offset based on the burst crossing signal which can be based on a selected function of the ABCD burst amplitudes measured at selected points.

Figure 1Q:
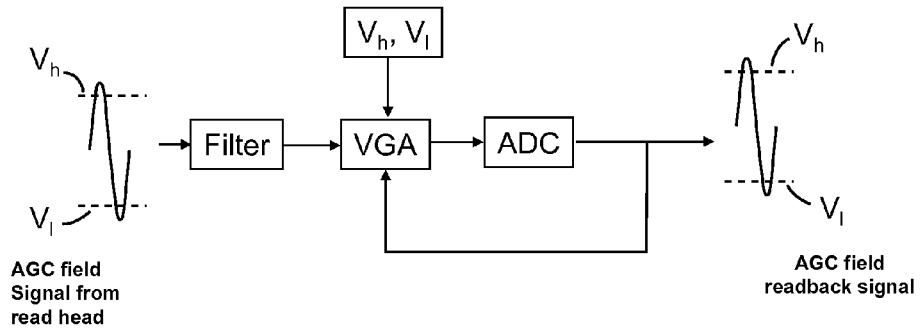
FIG. 1Q is a block diagram illustrating a general servo VGA adjustment loop based on AGC according to the prior art.

FIG. 1Q is a block diagram illustrating a general servo VGA adjustment loop based on AGC according to the prior art. The variable gain amplifier (VGA) circuit adjusts the gain such that output signal stays above limits (Vh, Vl). The goal is to compensate the effects of fly height and other magnetic variations in order to maintain consistent SNR in the output signal. This operation in performed on AGC field. VGA gain is adjusted to cancel any variation in AGC signal.

Figure 1R:
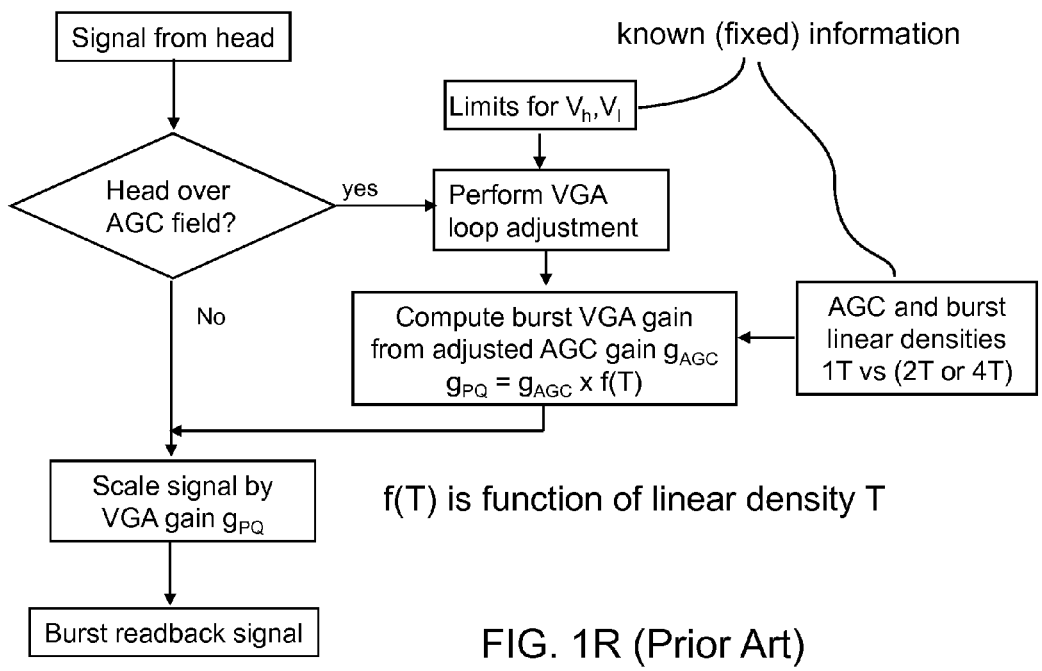
FIG. 1R is a block diagram illustrating General description of servo VGA adjustment loop based on AGC.

There is a relationship between the VGA gain adjusting loop for servo AGC and servo burst readback signal. A flowchart of this operation for the system illustrated in FIG. 1Q in given in FIG. 1R. VGA gain calibration is conventionally done using AGC field. The input signal comes from the standard preamp and is initially processed a filter which feeds variable gain amplifier (VGA). Gain is adjusted to maintain the signal above the required threshold limits ($V_h, V_l$). The role of VGA loop is to compensate the effects of fly height and other magnetic variations in order to maintain consistent SNR in the output burst signal.

Figure 1S:
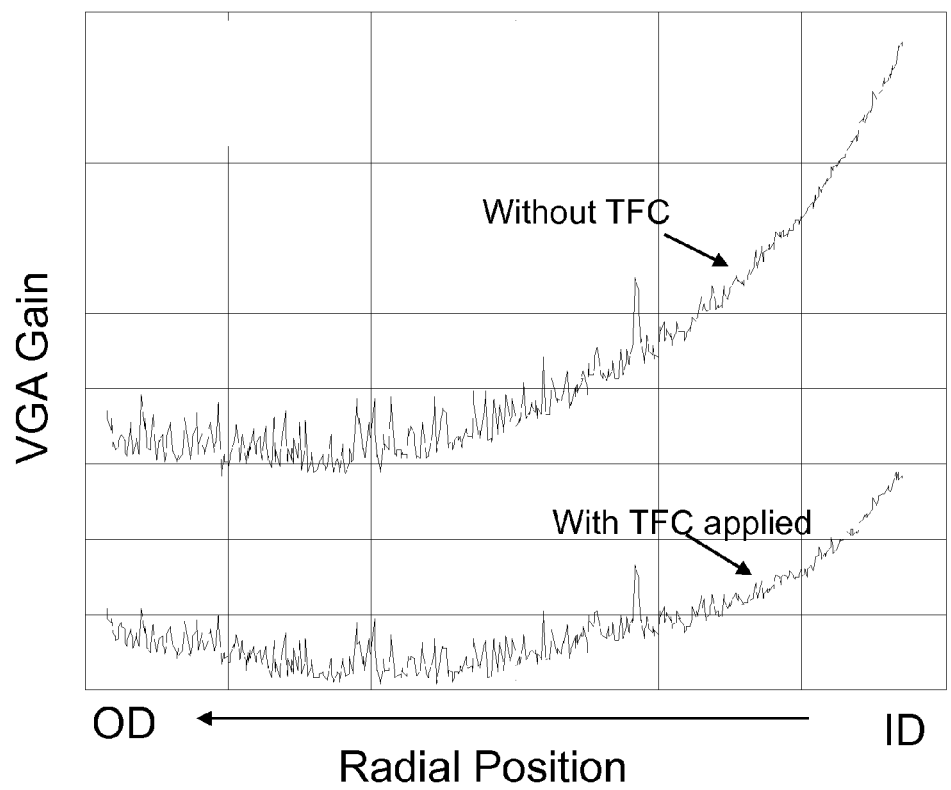
FIG. 1S is an illustration showing how VGA loop makes adjustment according to fly height and linear density changes according to the prior art. Inner diameter (ID) side produces smaller magnetic signal due to higher linear densities, so AGC gain is higher as compared to outer diameter (OD) side. Likewise when TFC is applied, head is flying closer to disk and magnetic signal is stronger which thereby requires smaller VGA gain.

FIG. 1S is an illustration showing how VGA loop makes adjustment according to fly height and linear density changes according to the prior art. Inner diameter (ID) side produces smaller magnetic signal due to higher linear densities, so AGC gain is higher as compared to outer diameter (OD) side. Likewise when thermal fly-height control (TFC) is applied, the head is flying closer to disk and magnetic signal is stronger which thereby requires smaller VGA gain.

In conventional disk drives, servo patterns are written at monotonically increasing linear densities from ID to OD with highest linear density at the ID. As a result ID tracks produces smaller magnetic signal. Hence AGC gain is higher as compared to OD tracks. Likewise when TFC is applied, head is flying closer to disk and magnetic signal is stronger which thereby requires smaller VGA gain.

At the end of VGA gain adjustment process (FIG. 1R), burst VGA gain is computed based on the calibrated AGC gain:

Burst gain=$AGC$ gain$\times f(T)$.

where f(T) is a known function of linear density T. Since bursts are written with lower density, they produce stronger magnetic signal than AGC fields. The function f(T) lowers the gain for 2T bursts to prevent ADC signal saturation. This function is selected offline during the design phase based on magnetic signal modeling of 1T vs 2T signals. Measured burst signals are scaled internally by burst gain. Burst values (and cross-track burst profile) are a function of VGA loop gain.

A problem being addressed by the present invention is that phase misalignment also contributes to signal drop. Track misalignment refers to finite error in servo sector locations of two adjacent tracks. Misalignment arises from write-gate jitter and timing disturbances during the servo writing process (SSW) which results in small deviation in servo sectors from ideal locations. Examples of servo pattern with track misalignment for seamed and seamless writing are shown in FIGS. 2A-D.

Figure 3:
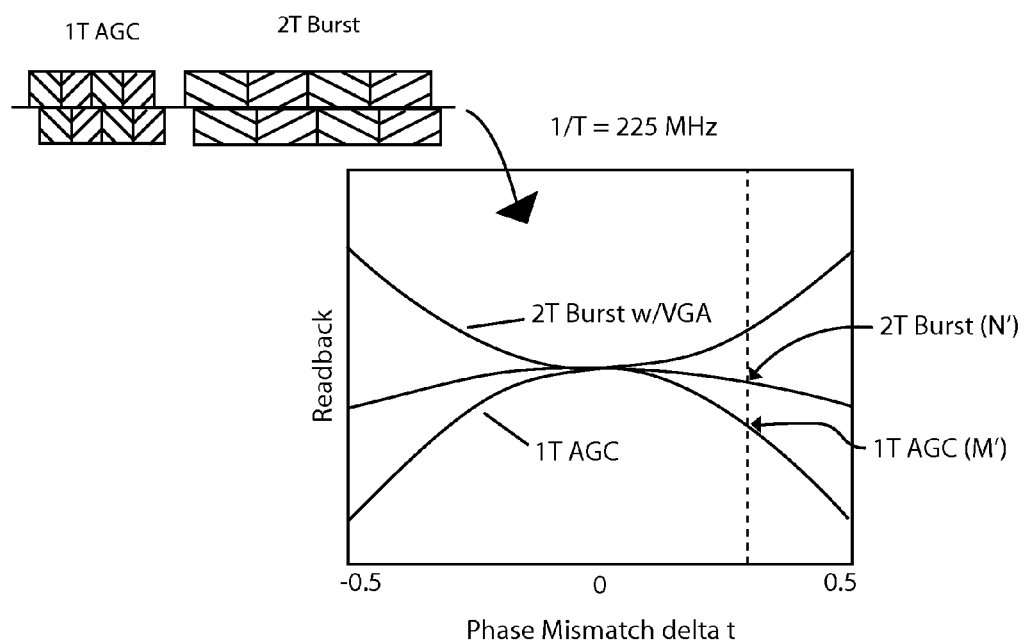
FIG. 3 illustrates that track misalignment causes magnetic signal loss for the same physical misalignment signal loss is different for 1T versus 2T servo patterns.

Track misalignment results in phase mismatch between adjacent tracks. The following discusses the behavior of the general VGA feedback loop for misaligned servo sectors, especially with difference in AGC/burst frequencies as illustrated in FIG. 3 where 1/T=225 MHz and the period for AGC is 1T and the period for servo burst is 2T. For same phase shift, 1T period AGC has more magnitude drop as compared to 2T period burst. VGA calibrated using AGC, so VGA gain is proportional to inverse of gain drop observed in AGC field. VGA loop will see more gain drop (lower line) as an effect of phase mismatch. As a result the VGA loop will increase the AGC gain in order to compensate the drop in AGC field signal. Since the burst gain is proportional to the AGC, VGA gain for fixed f(T), the burst gain is increased accordingly, which amplifies the corresponding servo bursts (upper line: 2T Burst w/VGA). The ideal VGA gain for burst is, however, the inverse of the center line, 2T Burst. Hence phase mismatch induced by track misalignment results in wrong gain for the servo burst. For example, for −0.4 nsec phase mismatch between adjacent tracks can result in AGC field magnitude drop by 4%, while burst magnitude drops by ~1%. However VGA loop will adjust to cancel 4% drop in AGC field but will also amplify the burst gain by 4% which will result in 3% net amplification in the burst signal.

The effect of phase mismatch is worse for seamless patterns where AGC, P, and Q bursts have different phase mismatch because they are written independently in different writing steps as described above. As a result, VGA gain calibrated based on AGC phase mismatch may distort one burst more than the other. An example is shown in FIGS. 4A-B for servo pattern with seamless AGC and seamless PQ bursts where P burst is written at the same time as AGC while Q burst is written in separate write step. Accordingly the P burst has same phase mismatch as AGC (location 2 in FIG. 4B) while Q may have entirely different misalignment error. Due to linear density difference between 1T AGC and 2T PQ bursts, both P and Q bursts will show smaller signal drop due to mismatch. However due to seamless architecture, Q burst has much smaller misalignment effect at track boundaries where AGC and P burst are most sensitive (location (2) in FIG. 4B). At the same time, Q burst will show signal drop at location (1) where AGC and P see no signal drop. This will result in burst signal distortion as shown in cross track burst profile on FIG. 4B where P and Q have different sensitivity to phase mismatch and AGC gain.

Thus, using same (proportional) gain for servo bursts introduces error in cross-track burst profile and corresponding servo calibration processes. In particular, wrong VGA gain results for misaligned bursts and phase mismatch introduces error in squeeze measurement. Change in cross-track profile is due to phase mismatch and A, B, C, D or P, Q magnitude change due to phase mismatch. In testing drives down-track shift is wrongly recorded as cross-track squeeze, but only cross-track squeeze is harmful to data integrity. The result is unnecessary yield loss and non-optimal performance.

Figure 5A:
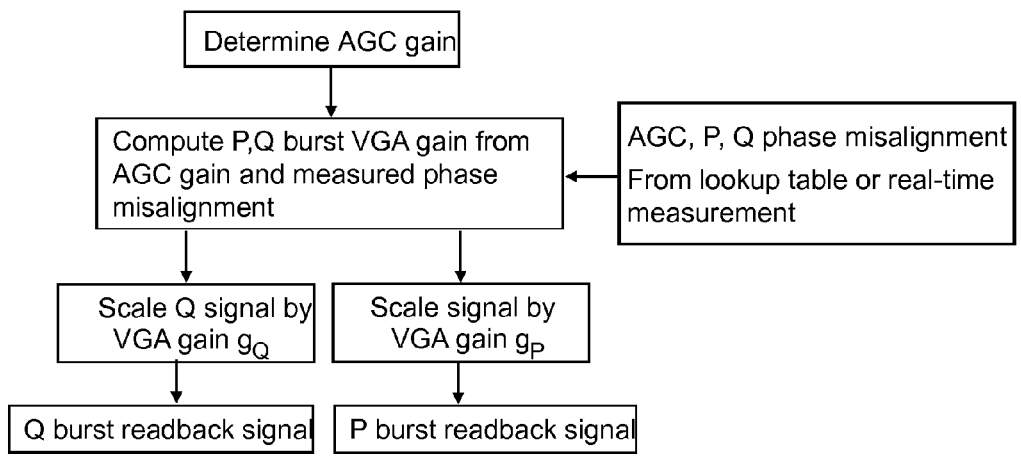
FIG. 5A is a simplified flow chart of the servo VGA adjustment loop based on AGC according to an embodiment the invention.

FIG. 5A is a simplified flow chart of the servo VGA adjustment loop based on AGC according to an embodiment the invention. The AGC gain is first determined according to standard principles. This AGC gain is then used along with AGC, P and Q phase misalignment measured values to compute an adjustment or scaling value for the P and Q burst signals. The AGC, P and Q phase misalignment values can be supplied from real-time measurements or can be retrieved from a table of previously measured values that was created as part of the manufacturing process using a technique described below.

Figure 5B:
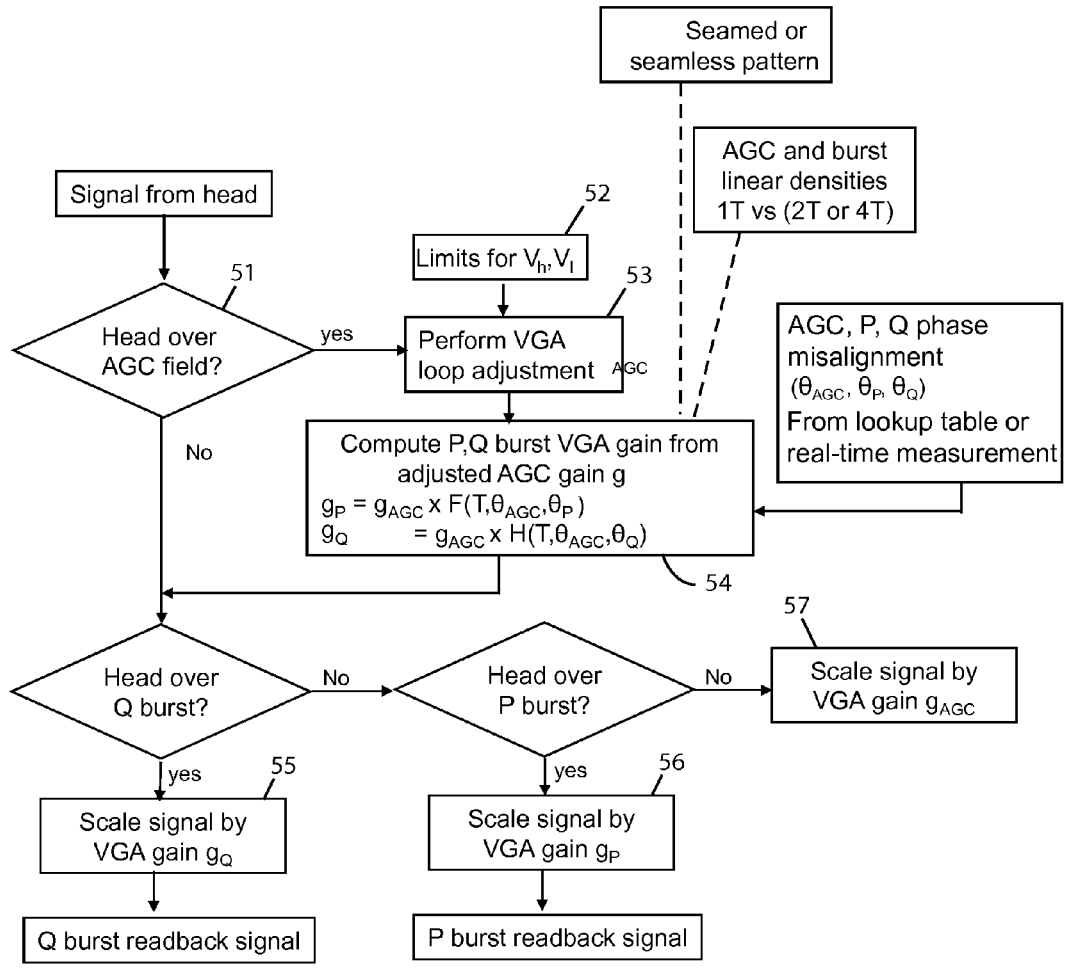
FIG. 5B is a more detailed flow chart of the servo VGA adjustment loop based on AGC according to an embodiment the invention.

FIG. 5B is a more detailed flow chart of the servo VGA adjustment loop based on AGC according to an embodiment the invention. The standard VGA adjustment loop described above is modified to include phase mismatch information while computing the burst gains. Conventional VGA gain calibration is performed based on the AGC field signal first to provide adjusted gain $g_{AGC}$. When the head is over the AGC field 51, the VGA loop adjustment is performed 53 using supplied limits for $V_h$ and $V_l$ 52. Next, P and Q burst gains are computed 54 based by scaling AGC gain by F( ) and H( ) which are now functions of phase mismatch in AGC ($\theta_{AGC}$), phase mismatch in burst P ($\theta_P$), phase mismatch in burst Q ($\theta_Q$), and linear density difference between 1T AGC and 2T bursts. Methods to measure phase mismatch in AGC, P, and Q bursts are described below. Phase mismatch calibration can be done during manufacturing and stored in look-up table, or can be performed during drive operation.

Functions F( ) and H( ) are designed to use the phase mismatch information to compute VGA gain change solely due to phase mismatch for 1T AGC (M') and 2T bursts (N'). Head response data similar to that shown in FIG. 3 can be used. The phase misalignment value can be converted into servo VGA loop gain using a predetermined table of values of readback signal values for AGC and servo bursts at a set of selected phase mismatch values. The bursts are then scaled with corrected VGA gain to obtain correct burst profile using AGC gain scaled by M'/N' where M' is the signal drop in AGC due to phase mismatch $\theta_{AGC}$, while N' is the drop in 2T burst due to phase mismatch $\theta_P$ and $\theta_Q$).

$$\text{Burst gain} = g_{AGC} \times (M'/N')$$

Depending upon servo pattern writing process, AGC and PQ bursts may have same phase mismatch as in seamed pattern wherein $$\theta_{AGC} = \theta_P = \theta_Q$$

or the phase mismatch can be different ($\theta_{AGC}$, $\theta_P$, $\theta_Q$) as in seamless patterns. Accordingly we may have different burst gain for P ($g_P$) and Q ($g_Q$). When the Q burst is processed, the signal is scaled by $g_Q$ 55 the derived the final Q burst readback signal. When the P burst is processed, the signal is scaled by $g_P$ 56 the derived the final P burst readback signal. At the end of this process, each burst is scaled appropriately providing more accurate burst readback signal. The resulting burst profile can be used to improve squeeze detection and other servo calibration processes. When the neither the P or Q bursts are being processed the signal is scaled by adjusted gain $g_{AGC}$ 57.

A similar process can be applied for ABCD-burst pattern embodiment.

Servo Sector Misalignment Detection

The objective is to detect track misalignment and resulting phase mismatch in AGC, P and Q bursts in both seamed as well as seamless patterns. Phase mismatch in AGC can be obtained by recording the change in sector-to-sector timing interval across the actuator stroke based on U.S. Pat. No. 7,551,390 described above. In a conventional servo pattern, sector timing reference is provided by the sync mark which is phase aligned with AGC. As a result, this method can only provide AGC phase mismatch information. For seamed patterns, this method can be used for burst phase mismatch detection because AGC and bursts have same misalignment for seamed servo patterns.

Figure 6:
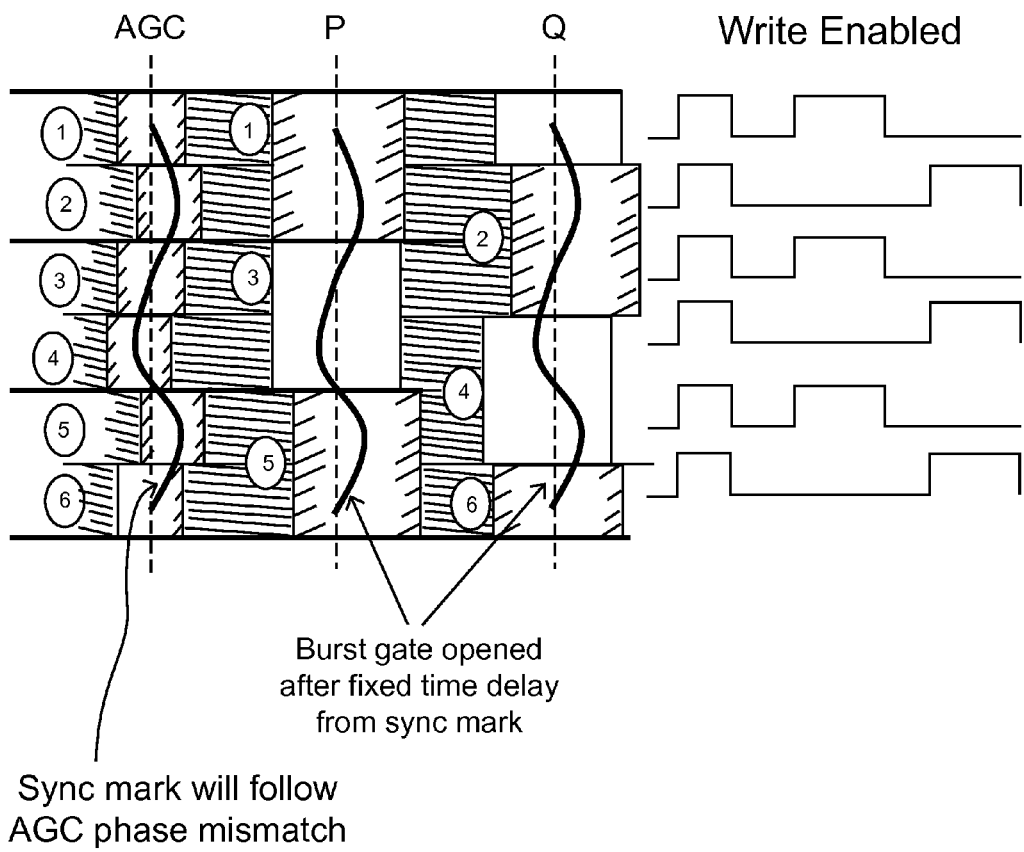
FIG. 6 illustrates a first method of measuring track misalignment in an embodiment of the invention.

In an embodiment of this invention, the phase of PQ bursts in addition to magnitude is recorded to measure the phase mismatch of AGC and PQ bursts. FIG. 6 illustrates an embodiment with a seamless 2T null servo burst pattern using a seamed AGC field. The burst gate is opened a fixed time delay after the sync mark and phase of PQ bursts are measured with respect of the burst gate. Since the sync mark follows the AGC phase mismatch, burst gate can be used as the equivalent of the AGC phase. In seamless burst patterns, where one burst is written per AGC write during servo writing, phase mismatch is a function of measured phase difference between bursts. For example, phase of P burst at boundary of (1) and (2) in FIG. 6 directly provides information about AGC and Q burst phase mismatch at that location. Similarly, phase of Q burst at boundary of (2) and (3) provides information about AGC and P burst mismatch. Accordingly, this method can be used to measure AGC as well as PQ burst mismatch, especially for seamless bursts written with seamed AGC.

Figure 7:
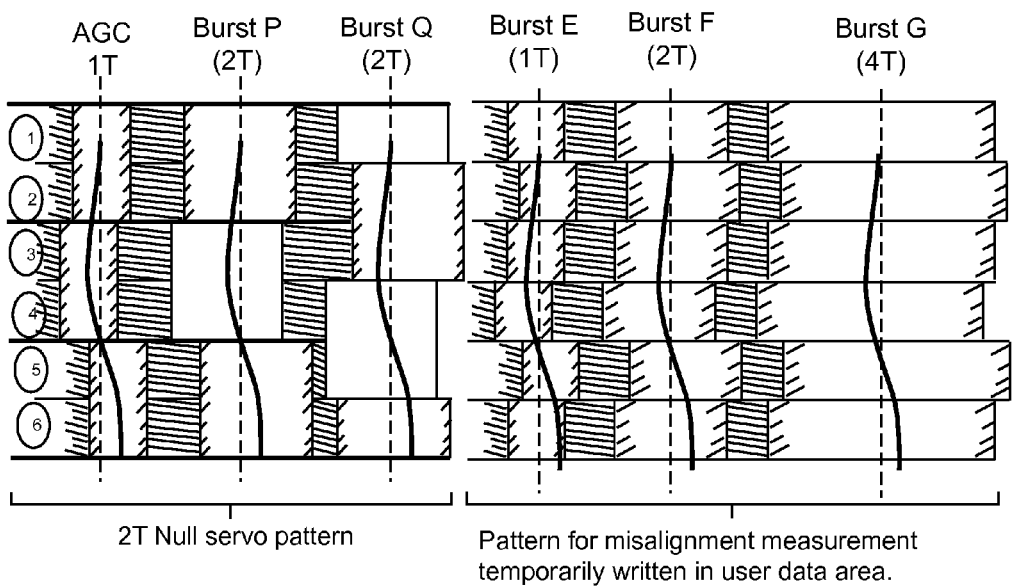
FIG. 7 illustrates a second method of measuring track misalignment in an embodiment of the invention using a selected calibration pattern written in the user data area.

In another embodiment of the invention, special temporary test burst patterns are written along with the standard servo sectors during the self-servo writing (SSW) process as illustrated in FIG. 7. The test burst patterns are written in the user data and are used only for track misalignment detection. The test bursts are written at the same time as the standard servo fields during SSW and, therefore, will have same misalignment, if any, as the original servo burst fields. Once the misalignment test is done, these additional test bursts are automatically overwritten when user data is written in the standard way in subsequent operations.

FIG. 7 illustrates an embodiment for use in a disk drive with 2T Null pattern with seamless AGC and seamless bursts, which are illustrated on the left side of the figure. In this embodiment SSW will initially write the PQ bursts followed by the EFG bursts as shown. After the calibration test only PQ will remain, so normal drive operation still uses only P and Q bursts. The additional temporary burst patterns (E, F, G) shown on the right side of FIG. 7 are written in seamed manner, and have linear density of 1T for burst E; 2T for burst F; and 4T for burst G. The PQ bursts both have linear density of 2T.

Figure 8:
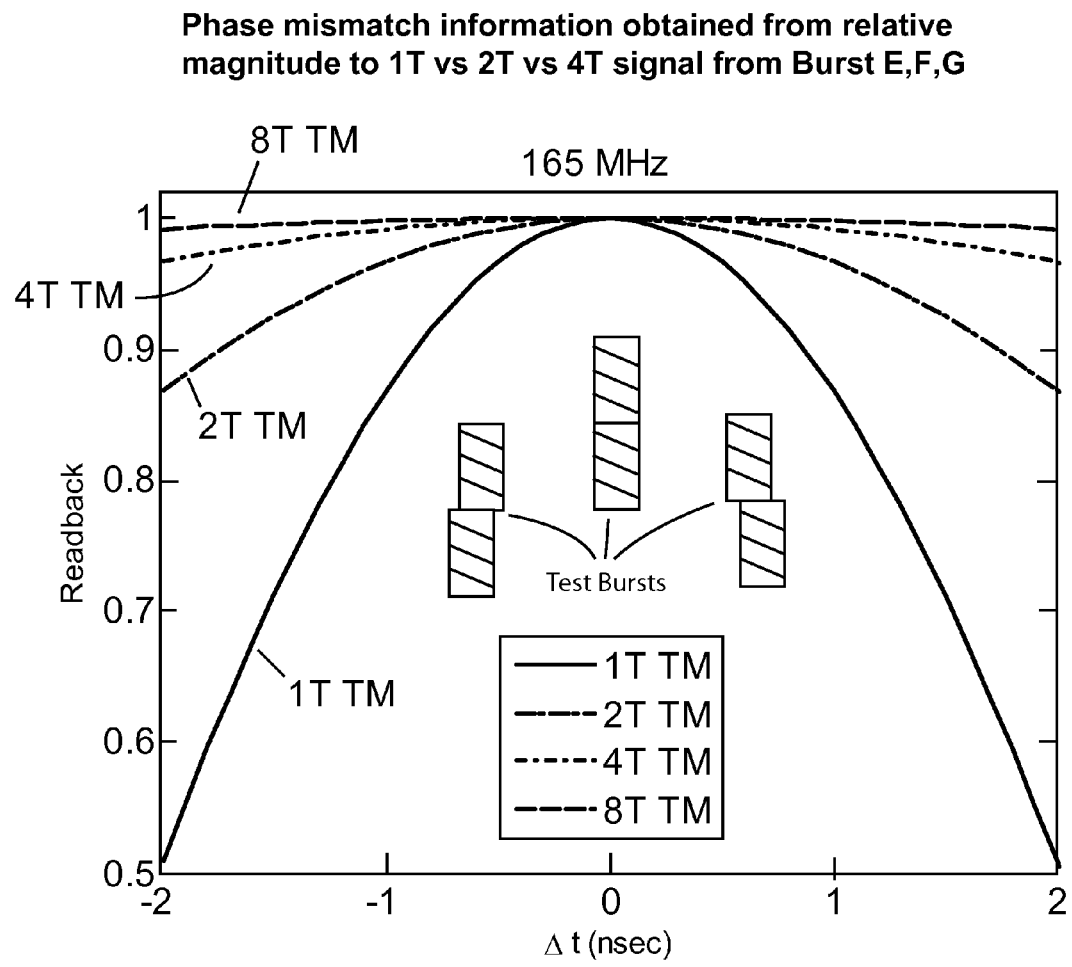
FIG. 8 illustrates a method of measuring phase mismatch information in an embodiment of the invention using a selected calibration pattern written in the user data area.

Phase mismatch information is obtained from relative magnitude to 1T, 2T, and 4T signals as shown in FIG. 8 for 165 MHz servo pattern. In an embodiment of this invention, additional burst patterns may have different linear densities and phase mismatch information is obtained from comparison of signal drop in 1T vs 2T vs 4T signal for same misalignment based on the signal sensitivity plots as shown in FIG. 8. Since these patterns were written in seamed manner, they provide phase mismatch information for (1) to (6) locations. Using this data, phase mismatch for AGC, P, and Q bursts can be derived for either seamed or seamless patterns. As an example for the seamed 2T null pattern with seamless AGC and seamless bursts shown in FIG. 7, phase mismatch of burst Q at track boundary of (1)-(2) is equal to the phase mismatch of EFG bursts at (1)-(2). Likewise, phase mismatch of AGC and P burst at location (2)-(3) is directly obtained from phase mismatch of EFG bursts at (2)-(3).

In an embodiment of this invention, phase information can be additionally recorded for special calibration bursts EFG. Accordingly, phase mismatch information is obtained from both magnitude and phase of EFG bursts.

In an embodiment, the phase mismatch measurements for AGC and PQ bursts using any of the methods described above are done offline during manufacturing process and the resulting data is stored in a table in nonvolatile memory. The phase data may be interpolated to obtain higher resolution information at all radial locations.

In another embodiment of this invention the methods described above are used during the self-servo write operation to detect and correct track misalignment such that servo pattern are written with minimal phase mismatch.

These methods can be suitably modified to detect phase mismatch in seamed or seamless ABCD burst patterns. Accordingly, the embodiments of this invention are not restricted to PQ burst patterns.

The invention claimed is:

1. A method of operating a disk drive, the disk drive having a disk with servo information arranged in concentric tracks that include a plurality of servo sectors having an automatic gain control (AGC) field followed by servo bursts, the method comprising:
   determining an AGC gain for a signal generated by an AGC field in a servo sector on a rotating disk passing under a read head; and
   calculating a first burst signal adjustment value for a first servo burst field using the AGC gain and a selected function of a set of inputs including an AGC field phase misalignment value and phase misalignment value for the first servo burst field.

2. The method of claim 1 wherein the set of inputs includes the period of the selected burst field.

3. The method of claim 1 wherein the AGC field phase misalignment value and phase misalignment value for the first servo burst field are measured during real time operation of the disk drive.

4. The method of claim 1 wherein the AGC field phase misalignment value and phase misalignment value for the first servo burst field are read from a table measured values created during a manufacturing process and stored in nonvolatile memory.

5. The method of claim 4 wherein AGC field phase misalignment value and phase misalignment value for the first servo burst field are measured by a calibration process that includes writing and then reading a set of test bursts in a data area, the set of test bursts including bursts written at first and second linear densities.

6. The method of claim 5 wherein the first linear density is T and the second linear density is 2T and the set of test bursts includes test bursts written at linear density 4T and the calibration process includes determining the phase misalignment value from relative magnitude differences for readback signals for the test bursts having first and second linear densities.

7. The method of claim 1 further comprising calculating a second burst signal adjustment value for a second servo burst field using the AGC gain and a selected function of a set of inputs including an AGC field phase misalignment value and phase misalignment value for the second servo burst field.

8. The method of claim 1 wherein the AGC field is seamed and the servo bursts are seamed.

9. The method of claim 1 wherein the AGC field is seamed and the servo bursts are seamless.

10. The method of claim 1 wherein the AGC field is seamless and the servo bursts are seamless.

11. The method of claim 1 wherein the AGC field is seamless and the servo bursts are seamed.

12. The method of claim 1 wherein the AGC field phase misalignment value is derived from a location of a sync mark and phase of the first servo burst is measured with respect to a burst gate which is opened a fixed time delay after the sync mark.

13. The method of claim 1 wherein the first burst signal adjustment value corrects for cross-track squeeze.

14. The method of claim 1 wherein the AGC field has linear density of T and first burst signal has linear density of 2T.

15. The method of claim 14 wherein the AGC field phase misalignment value and phase misalignment value for the first servo burst field are read from a table measured values created during a manufacturing process and stored in nonvolatile memory.

16. The method of claim 15 wherein AGC field phase misalignment value and phase misalignment value for the first servo burst field are measured by a calibration process that includes a) writing a set of test bursts in a data area during a self-servo writing process, the set of test bursts including test bursts written at first and second linear densities, and b) determining the phase misalignment value from relative magnitude differences for readback signals for the test bursts having first and second linear densities.

17. The method of claim 16 wherein the set of test bursts includes test bursts written at linear density T, 2T, and 4T.

* * * * *